Aug. 22, 1933.    C. W. DARRAH    1,923,355
CAR HEATER
Filed Dec. 12, 1931

Inventor
Carl W. Darrah
By Blackmore, Spencer & Faust
Attorneys

Patented Aug. 22, 1933

1,923,355

UNITED STATES PATENT OFFICE 1,923,355

CAR HEATER

Carl W. Darrah, Lockport, N. Y., assignor to Harrison Radiator Corporation, Lockport, N. Y., a Corporation of New York Application December 12, 1931
Serial No. 580,525

3 Claims. (Cl. 257—137)

This invention relates to heating devices and has particular reference to a hot water heater adapted for installation at the dashboard of an automotive vehicle.

The heater of the invention is of the type which utilizes the hot water from the cooling system of the internal combustion engine by forcing the hotter water from the engine through the heater and returning the cooled water to the pump. A fan or blower at the heater passes air through a honeycomb structure, the air taking the heat from the water and being passed by the blower into the interior of the vehicle to heat the same.

The principal novelty of the invention resides in a more compact structure and one which is easier installed in the vehicle. In prior heater constructions, the inlet or outlet pipes or both have been passed entirely through the heater or around the heater to the front thereof which was objectionable and more expensive than the present construction. In the present invention, both inlet and outlet pipes are secured to the heater core at the dashboard side and deliver and take the water from the heater jacket at the dashboard side. The inlet pipe is secured to the core near its bottom while the outlet is secured at the core top, thereby avoiding air pockets in the core. The jacket has a partition substantially at its mid portion to prevent the water from flowing directly from the inlet to the outlet. The partition forces the water to pass through one side of the honeycomb structure to a jacket at the front side of the heater. From this jacket, the water returns in a reversed direction through the other side of the honeycomb structure to a second compartment in the first jacket and then out at the outlet pipe.

Figure 1:
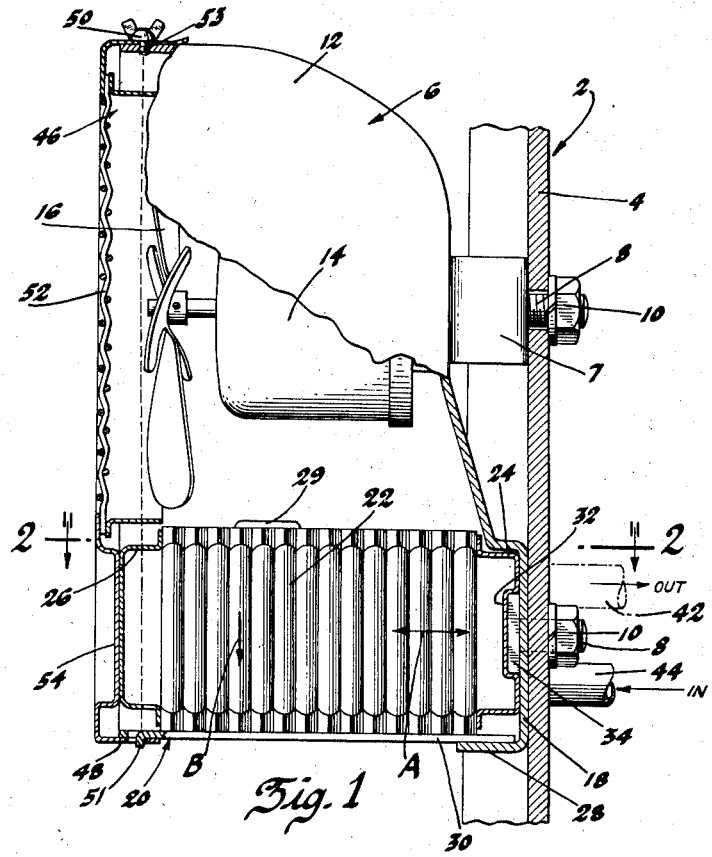
Figure 1 is a sectional view on the line 1—1 of Figure 2 showing the heater attached to the dashboard of the vehicle.

Referring to the drawing, the numeral 2 indicates a vehicle as a whole having the dashboard 4. The heater of the invention is indicated as a whole at 6 and is secured to the dashboard by means of the bracket 7 and the bolts 8 and nuts 10.

The upper part of the heater comprises a portion of the housing 12 in which there is positioned the electric motor 14 which drives the fan or blower 16. The electric motor receives its current from the battery of the automobile or other suitable source of electrical energy.

Figure 2:
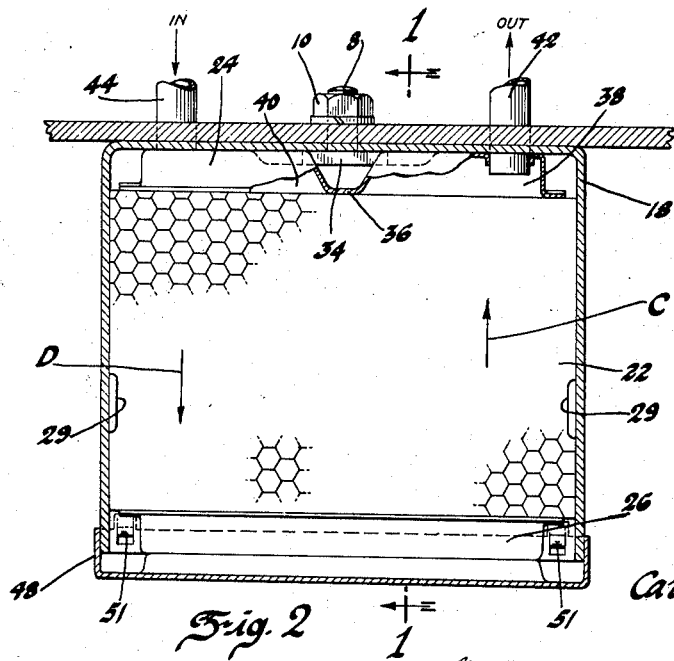
Figure 2 is a section on the line 2—2 of Figure 1.

The lower portion of the heater comprises the lower portion 18 of the housing 12. The section 18 is substantially rectangular in shape as shown in Figure 2 and is open at its bottom as indicated at 20. In the section there is positioned the honeycomb structure 22 which includes a jacket 24 secured thereto in water tight relation at the dashboard side and a second jacket 26 similarly secured thereto at the front side of the heater. The honeycomb structure 22 and its jackets rest upon flanges 28 and 30 formed at the back and sides of the housing 12 and is held in place by the indentations 29 pressed from the sides of the housing 12.

The rear or dashboard jacket 24 has a suitable indentation 32 formed therein which accommodates the head 34 of the bolt 8. The jacket 24 is further provided with a partition or wall 36 which extends the entire height of the jacket and separates the outlet side or compartment 38 from the inlet side or compartment 40. An inlet in the form of a short pipe 44 delivers to the inlet compartment 40 and an outlet in the form of a short pipe 42 takes the water away from the outlet compartment 38 of the jacket 24. The jacket 26 has no partition but is free and unobstructed to allow a free passage of the water.

The honeycomb structure 28 and the inlet and outlet pipes 44 and 42 form a unit withdrawable from the front of the housing 12. The unit is reversible and may be inserted either as shown or inverted and slid in place. In the latter case the outlet 42 will become the inlet and the inlet 44 the outlet. The inlet is always the lowermost pipe and the outlet the uppermost, the openings in the rear of the housing accommodating the pipes regardless of how the unit is inserted.

The front of the housing 12 is closed by the removable cover member 46 which has a lateral flange 48 which fits over the housing 12 and is secured thereto in any suitable way such as by the tongue and opening connection 51 and the bolts 53 and thumb screw 50. Instead of the thumbscrew and bolt 53 and 50 an opening in the casing 12 and an indentation in the cover 46 may be used so that the cover may be snapped into place. The upper portion of the cover member 46 has a circular opening therein over which there is positioned a screen 52 which extends in front of the fan 16. The lower portion of the cover is indented as at 54 and presses against the front jacket 26 rigidly to hold the parts in position.

The honeycomb structure 22 has water passages passing therethrough in the direction of the arrows A in Figure 1 and air passages for air to pass therethrough in the direction of the arrow B.

The operation of the device is as follows: When the engine of the vehicle is in operation, the water pump will circulate the hot water as it passes from the engine and force a portion thereof through the inlet pipe 44 to the inlet side 40 of the jacket 24. The water will pass through the side of the honeycomb structure as indicated by the arrow D in Figure 2 to the jacket 26 and from the jacket 26, it will pass through the opposite side of the honeycomb structure in the direction of the arrow C to the compartment 38 and to the outlet pipe 42, and be returned to the engine cooling system. At the same time, when the fan 14 is in operation, it will draw air from the interior of the vehicle through the screen 52 and force it through the honeycomb structure in the direction of the arrow B. The cooler air from the vehicle will strike the hot metal of the honeycomb structure 22 and take the heat therefrom. The honeycomb structure will then deliver the heated air to the interior of the vehicle from the bottom of the heater.

If desired the fan 16 may be driven in the reverse direction to reverse the direction of flow of the air.

The construction increases the velocity of the water flow through the core, since, in the old style of core, the water was taken into an undivided inlet tank and forced to flow through the entire core. In the present construction the water flows through half of the core before it returns through the other half and, consequently, the velocity is greater. This tends to have a sort of scrubbing action or effect which increases the amount of heat. Actual tests now show that, due to this particular thing, the heater with the divided inlet and outlet tanks is approximately 3° or 4° hotter than the old style.

I claim:

1. In a heater for application to an automotive vehicle, a blower at the upper portion of the heater, a water inlet and a water outlet at the same side of the heater, a partition between said inlet and outlet, a jacket at the side of the heater opposite the inlet and outlet, a honeycomb structure between the inlet and outlet and filling the heater space adjacent the blower, the water passing from the inlet through one side of the honeycomb structure through the jacket and back through the other side of the structure to the outlet, said blower drawing air through the honeycomb structure.

2. In a heater for attachment to the dashboard of an automotive vehicle, a blower at one end of the heater, a honeycomb structure at the other end, a water jacket at the dashboard side, a water inlet and a water outlet connected to the jacket, a partition in the jacket to prevent the water from flowing directly from the inlet to the outlet, and a second jacket at the heater side opposite the first-named jacket, said partition forcing the water to flow from the inlet across one side of the honeycomb structure to the second jacket and from the second jacket back through the other side of the honeycomb structure to the outlet.

3. In a heater for vehicles, a housing inclosing a water receiving heating unit and a means to force air to travel through the unit, said unit separately constructed from said housing and comprising end water tanks with inlet and outlet pipes secured to one tank, said unit being removable from said housing.

CARL W. DARRAH.